United States Patent
Armstrong et al.

(10) Patent No.: US 9,917,747 B2
(45) Date of Patent: Mar. 13, 2018

(54) PROBLEM DETECTION IN A DISTRIBUTED DIGITAL NETWORK THROUGH DISTRIBUTED PACKET ANALYSIS

(71) Applicant: International Business Machines Corporation, Armonk, NY (US)

(72) Inventors: William J. Armstrong, Rochester, MN (US); David R. Engebretsen, Cannon Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 14/868,644

(22) Filed: Sep. 29, 2015

(65) Prior Publication Data

US 2017/0093665 A1     Mar. 30, 2017

(51) Int. Cl.
*H04L 12/26* (2006.01)

(52) U.S. Cl.
CPC .......... *H04L 43/022* (2013.01); *H04L 43/062* (2013.01); *H04L 43/0829* (2013.01); *H04L 43/0852* (2013.01); *H04L 43/12* (2013.01)

(58) Field of Classification Search
CPC ............. H04L 43/0823; H04L 43/0852; H04L 63/1416
See application file for complete search history.

(56) References Cited

U.S. PATENT DOCUMENTS

| | | |
|---|---|---|
| 6,738,349 B1 | 5/2004 | Cen |
| 7,606,160 B2 | 10/2009 | Klinker et al. |
| 9,003,065 B2 | 4/2015 | Rothstein et al. |
| 2006/0182034 A1 | 8/2006 | Klinker et al. |
| 2008/0022106 A1* | 1/2008 | Singh .................. H04L 63/1416 713/176 |
| 2008/0307524 A1* | 12/2008 | Singh ...................... G06F 21/55 726/22 |
| 2010/0251364 A1* | 9/2010 | Lee ........................ H04L 63/145 726/22 |
| 2011/0286331 A1 | 11/2011 | Lauer |
| 2013/0329584 A1* | 12/2013 | Ghose .................. H04L 45/586 370/252 |
| 2013/0347103 A1 | 12/2013 | Veteikis et al. |
| 2015/0106670 A1 | 4/2015 | Gintis |
| 2015/0117244 A1 | 4/2015 | Williamson |
| 2016/0344715 A1* | 11/2016 | Kumar .................. H04L 63/126 |

OTHER PUBLICATIONS

Canini et al., "Per Flow Packet Sampling for High-Speed Network Monitoring", Communication Systems and Networks Workshops, p. 1-10, 2009.

* cited by examiner

*Primary Examiner* — Shukri Taha
(74) *Attorney, Agent, or Firm* — Martin & Associates, LLC; Bret J. Petersen

(57) ABSTRACT

A system and method performs packet analysis in a distributed communication network. Packet processors tap into data packet flow at various points in the distributed network. The packet processors processes data packets from the packet flow and select a set of packets using a packet signature function and packet selection criteria. A packet record is created by each packet processor and sent to other packet processors in the distributed network. The other packet processors add data to the packet record for the same set of packets. The packet records are analyzed to gather comparative data to identify problems in the network.

20 Claims, 6 Drawing Sheets

PROBLEM DETECTION IN A DISTRIBUTED DIGITAL NETWORK THROUGH DISTRIBUTED PACKET ANALYSIS

BACKGROUND

1. Technical Field

This disclosure generally relates to digital networks, and more specifically relates to problem detection in the network using packet analysis to compare the same digital packets at various points in the network.

2. Background Art

Computer communication, and increasingly telecommunications, rely on data transmission networks. Data flows in a network in units known as packets. The primary type of network used is the internet protocol (IP) network. Cell phones use Long Term Evolution (LTE) networks. LTE networks are very complex IP based networks where portions of the network equipment are distributed over broad geographical locations. As cell phone carriers migrate from legacy technologies to pure IP based voice and data using LTE and Voice Over LTE (VoLTE), managing the quality of service (QoS) on these networks becomes increasingly difficult. Problems include dropped packets, long latencies, incorrectly assigned QoS indicators, and multi-vendor networking solutions. Without tools to identify problem spots in the network, problems may take significant time and resources to repair which negatively impacts quality of serve and customer satisfaction.

BRIEF SUMMARY

The disclosure and claims herein provide a system and method for packet analysis in a distributed communication network. Packet processors tap into data packet flow at various points in the distributed network. The packet processors process data packets from the packet flow and select a set of packets using a packet signature function and packet selection criteria. A packet record is created by each packet processor and sent to other packet processors in the distributed network. The other packet processors add data to the packet record for the same set of packets. The packet signature function may include a hash function that operates on the payload portion of the packet which is typically unique and invariant for the packet. The value of the hash function is compared to the packet selection criteria to select a fraction of the data packets for processing on each of the tap points in the distributed network. The packet records are analyzed to gather comparative data to identify problems in the network.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein relate to a system and method for packet analysis in a distributed communication network. Packet processors tap into data packet flow at various points in the distributed network. The packet processors process data packets from the packet flow and select a set of packets using a packet signature function and packet selection criteria. A packet record is created by each packet processor and sent to other packet processors in the distributed network. The other packet processors add data to the packet record for the same set of packets. The packet signature function may include a hash function that operates on the payload portion of the packet which is typically unique and invariant for the packet. The value of the hash function is compared to the packet selection criteria to select a fraction of the data packets for processing on each of the tap points in the distributed network. The packet records are analyzed to gather comparative data to identify problems in the network.

Figure 1:
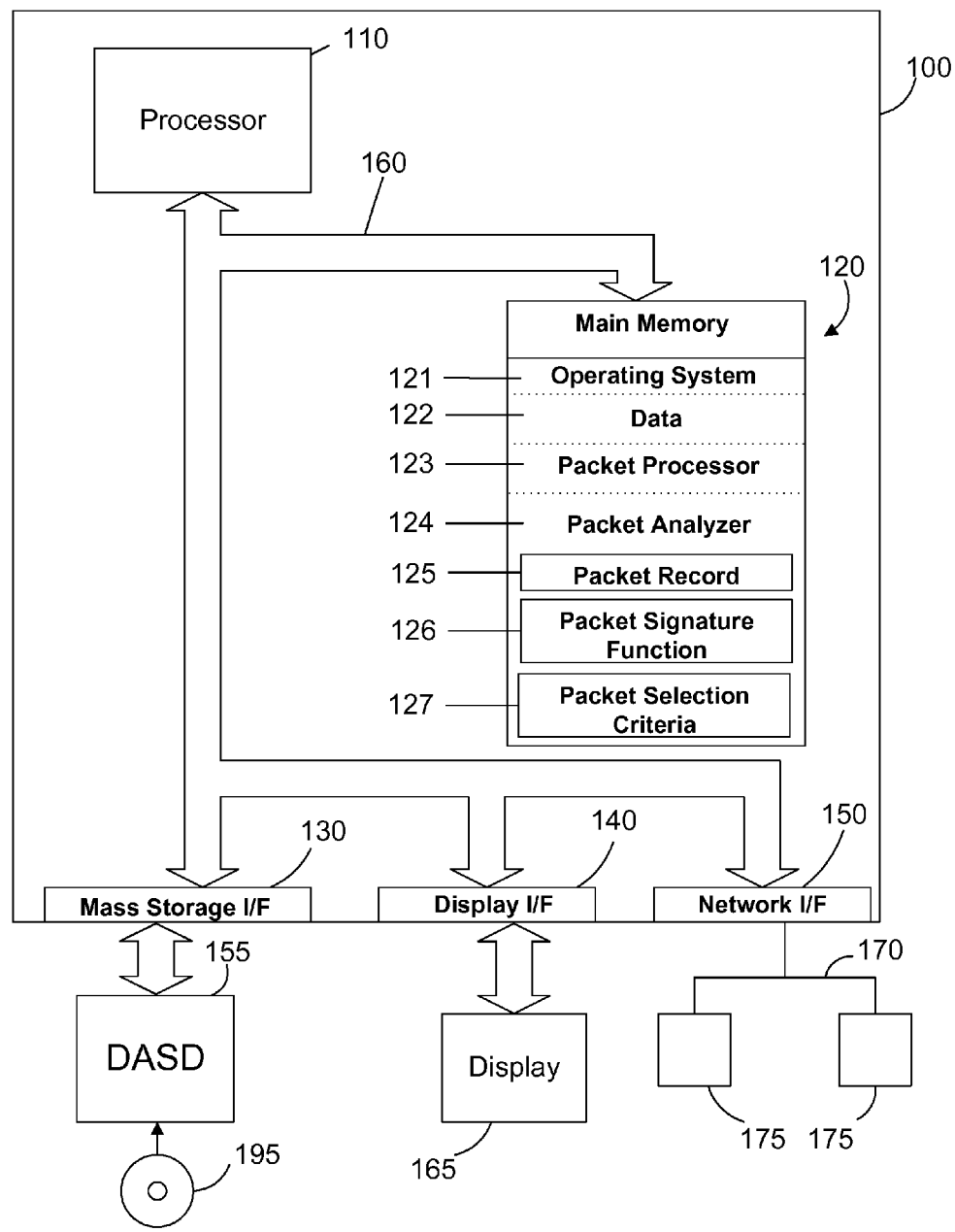
FIG. 1 is a block diagram a computer system with a packet processor and a packet analyzer as described herein.

Referring to FIG. 1, a computer system 100 is one suitable implementation of a computer system that includes a system for packet analysis in a distributed network as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195. Some devices may have a removable memory card or similar for a direct storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory further includes data 122, a packet processor 123 and a packet analyzer 124. The packet analyzer 124 includes a packet record 125, a packet signature function 126 and packet selection criteria 127. The packet record 125, the packet signature function 126 and the packet selection criteria 127 may also reside at times in the packet processor 123 as described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155.

Therefore, while operating system 121, data 122, packet processor 123, packet analyzer 124, packet record 125, packet processing function 126 and packet selection criteria 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the packet processor 123 and the packet analyzer 124.

Although computer system 100 is shown to contain only a single processor and a single system bus, those skilled in the art will appreciate that a packet processing and analyzing system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 2:
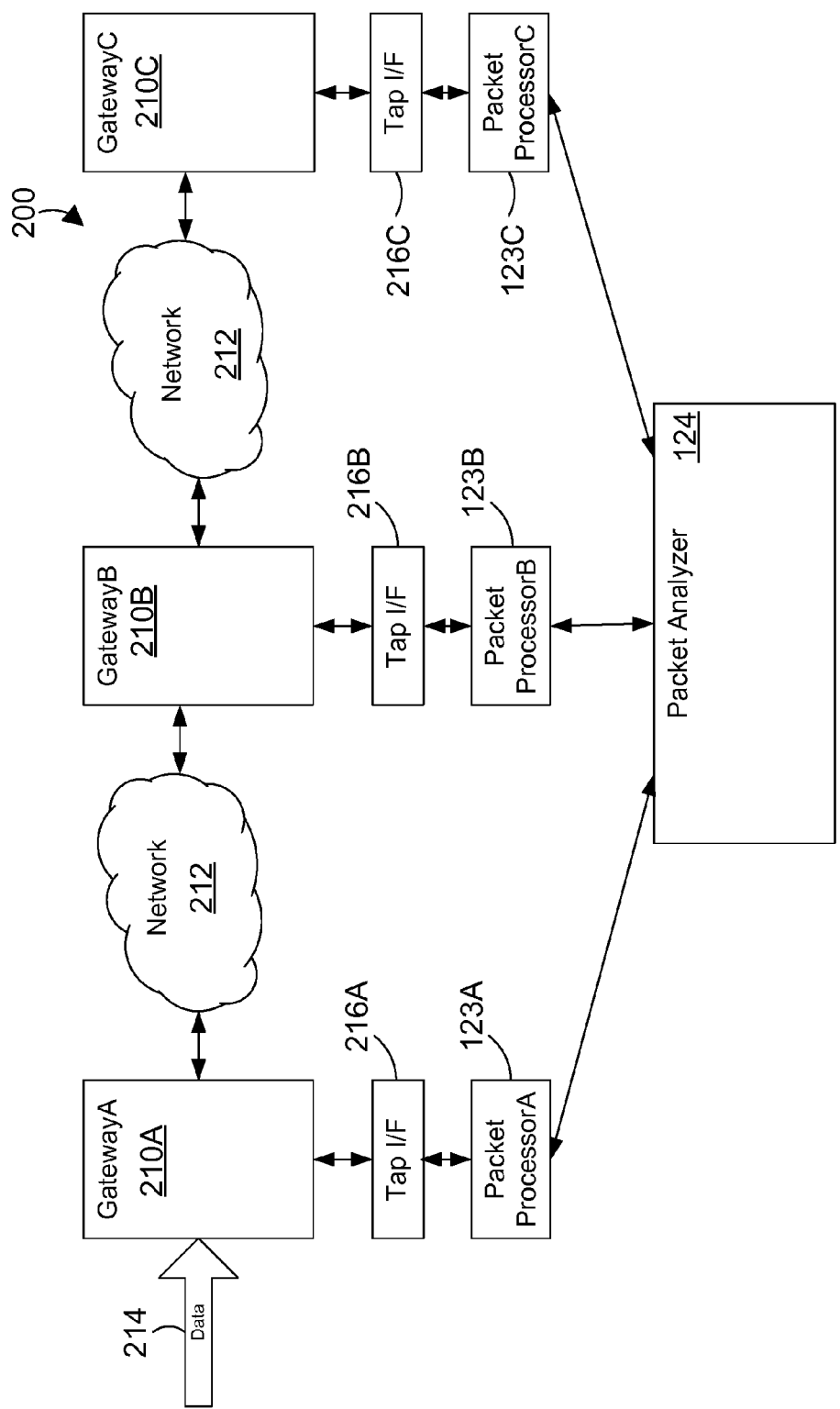
FIG. 2 is a simplified block diagram of a system for problem analysis in a distributed network system.

FIG. 2 illustrates a simplified block diagram of a system 200 for problem analysis in a distributed data network. Data 214 is represented as flowing into gatewayA 210A. Data from gatewayA 210A is then forwarded to gatewayB 210B and gatewayC 210C through the network 212. Network 212 represents other portions of the network that could include routers, switches, transmission lines, etc. as known in the prior art. Packet processors 123A, 123B, 123C (collectively referred to as 123) tap into data packet flow at a various points in the distributed network with tap interfaces 216A, 216B and 216C (collectively referred to as 216). The tap interfaces 216 provide a mirror image of the data flow to allow the packet processor to passively monitor network traffic. The tap interfaces 216 may operate in any suitable manner as known in the prior art or developed in the future. The packet processors 123 receive data packets from the tap interfaces 126 and process the data packets. The packet processors 123 select a set of packets using a packet signature function and packet selection criteria as described further below. A packet record is created and sent to other packet processors at multiple points in the distributed network to add data to the packet record for the same set of packets as described in further detail below. The packet analyzer 124 receives the packet records from the packet processors 123 for analysis.

Figure 3:
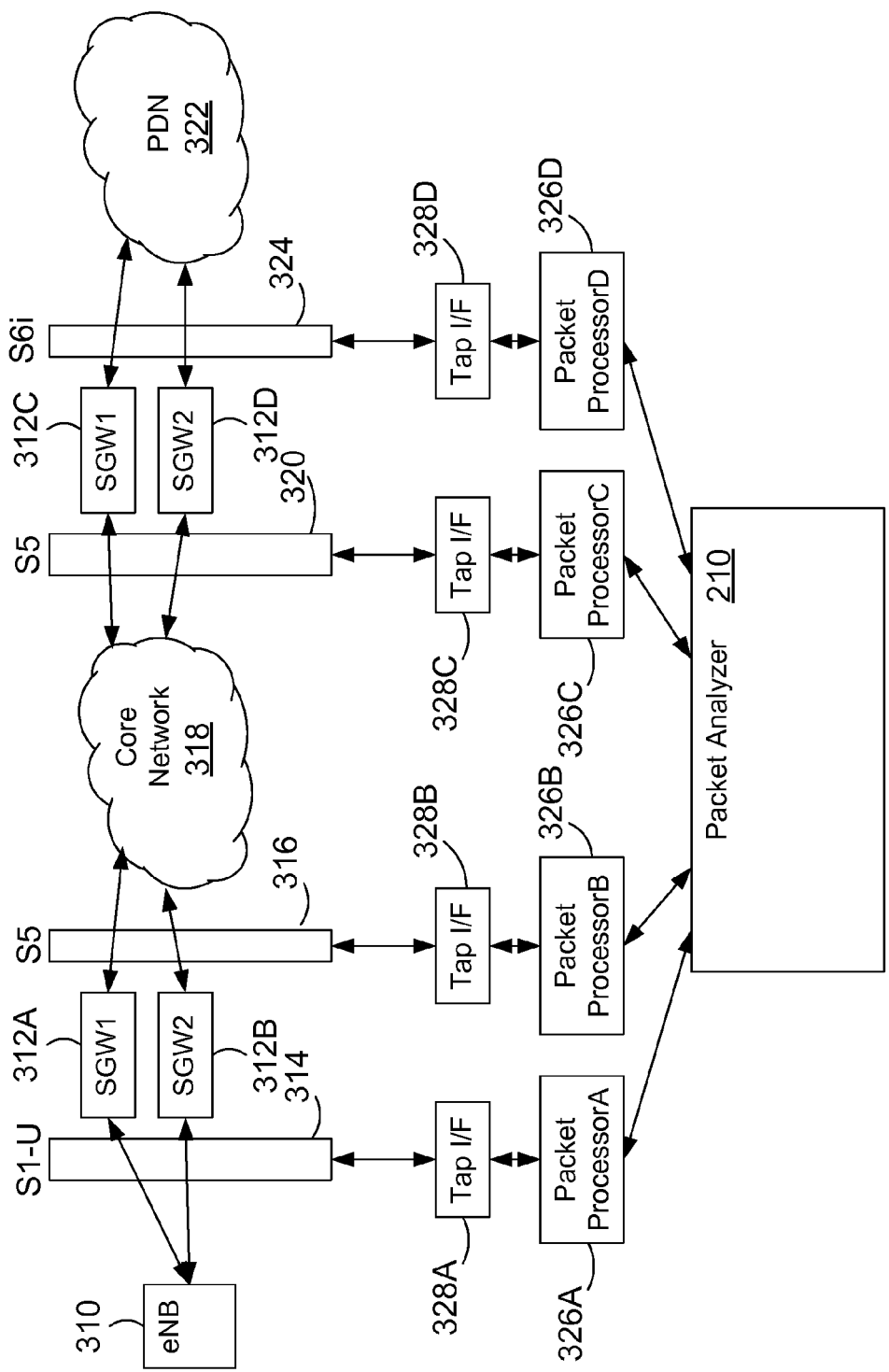
FIG. 3 is a simplified block diagram of a system for problem analysis in a LTE distributed communication network.

FIG. 3 is a simplified block diagram of a system 300 for problem analysis in a Long Term Evolution (LTE) distributed communication network. Where FIG. 2 was directed to a generic network architecture, FIG. 3 applies a similar set of components to provide problem analysis in an LTE architecture. In the LTE architecture, an Evolved Node B, or eNodeB 310 is the basic element at the edge of the LTE radio access network. The eNodeB 310 processes signals from cell phones and forwards the data to a gateway (SGW1 312A, SGW2 312B) over the S1-U bus 314. The gateways 312 send data through the S5 bus 316 over the core network 318. At another location in the system, the data passes again through an S5 bus 320 to other gateways (SGW1 312C, SGW2 312D). These gateways 312C, 312D access the PDN network 322 over the S6i network 324. System 300 includes packet processors 326A, 326B, 326C and 326D (collectively referred to as 326). However, it is understood that any number of packet processors may be used. The packet processors 326 tap into data packet flow in the distributed network with a tap interfaces 328A, 328B, 328C and 328D. As described above, the tap interfaces 328 provide a mirror image of the data flow to allow the packet processor to passively monitor network traffic. The packet processors 326 receive data packets from the tap interfaces 328 and process the data packets as further described below. In this example, the tap interfaces 328 tap into network buses of the LTE network.

Figure 4:
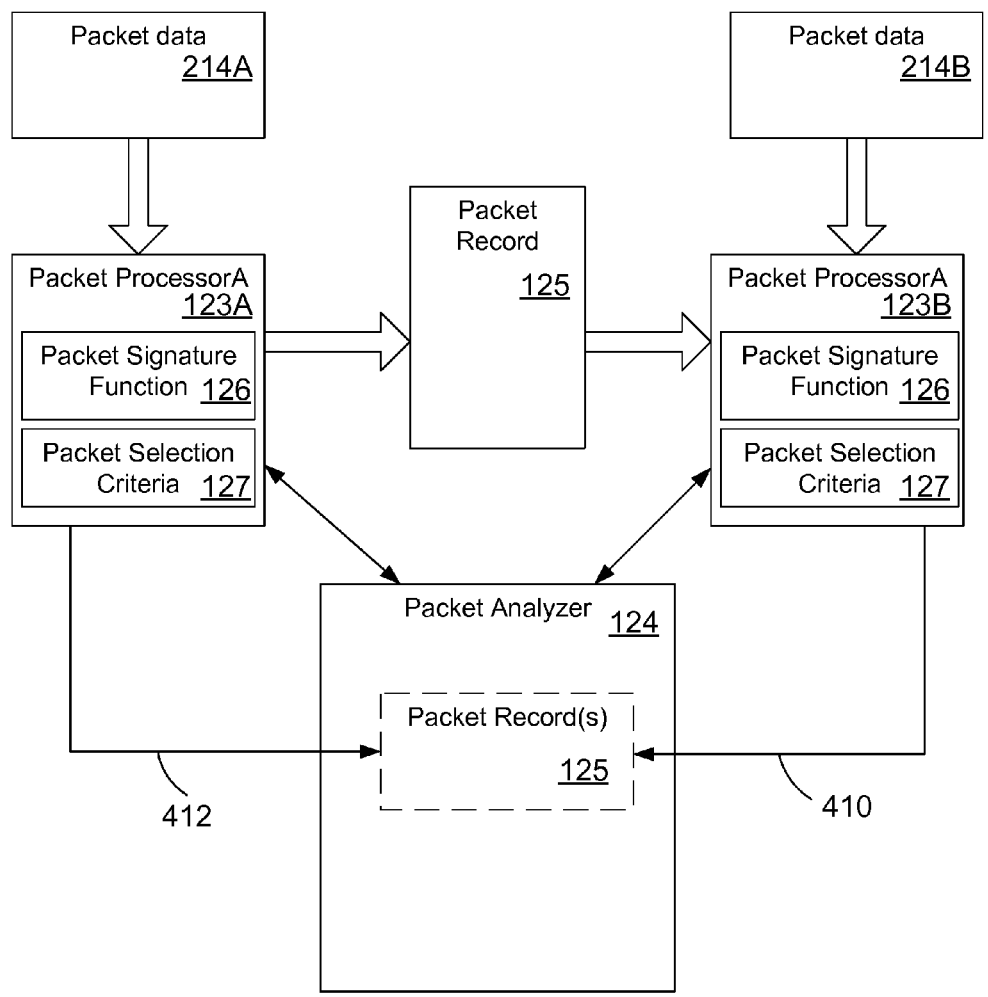
FIG. 4 is a simplified block diagram that illustrates an example of packet record forwarding.

FIG. 4 is a simplified block diagram that illustrates additional detail of the operation of the packet processor 123 and packet analyzer 124 described above with reference to the architecture in FIG. 2, but FIG. 4 equally applies to the architecture shown in FIG. 3. As introduced above, the packet processorA 123A receives data packets from the tap interface (not shown). The packet processorA 123A selects a set of packets using a packet signature function 126 and packet selection criteria 127. Similarly, the packet processorB 123B selects a set of packets using the packet signature function 126 and packet selection criteria 127. The packet processorA 123A uses the selected packets from the packet data 214 to create a packet record 125. The packet processorA 123A then sends the packet record 125 to other packet processors at multiple points in the distributed network. In this example, the packet processorA 123A sends the packet record 125 to packet processorB 123B. The packet processorB 123B similarly processes packet data 214B and adds data to the packet record 125 corresponding to the same set of packets selected by packet processor 123A. Packet processorB 123B then forwards 410 the packet record 125 to packet analyzer 124. Packet processor 123A may also forward 412 a copy of the packet record to the packet analyzer 124.

As described above with reference to FIG. 4, the packet processor 123A selects a set of packets using a packet signature function 126 and packet selection criteria 127. The packet signature function provides a signature for a packet to distinguish and identify the packet. For example, the packet signature function may be any suitable hash function that can be applied to a portion of the packet to give a packet signature. The packet signature function may be applied to a payload portion of the packet since it will have a high probability of being unique. The payload may be a tunneled payload, meaning it is a payload on a tunnel portion of a packet flow. The unique signature for each selected packet is stored in the packet record with corresponding data for analysis as described further below. Storing data with the unique signature will allow data stored in the packet record to be compared to data gathered from the same packet when the packet reaches another packet processor. In order to reduce the amount of data in the packet record, packet selection criteria is applied to the packet signature or the packet payload to select a number of packets to process. The packet selection criteria may be a simple pass through filter to randomly select some fraction of the packets. For example, the packet selection criteria may select one out of of a given number of packets such as one of every 10 packets or one of every 50 packets. The packet selection criteria may be assigned by a user through a user interface on the packet analyzer.

As described above with reference to FIG. 4, the packet processor uses the selected packets from the packet data 214 to create a packet record 125. For each packet selected as described above, the packet analyzer stores data in the packet record. The data stored in the packet record for each packet may include the packet signature, quality of service and analysis parameters, a location for the gathered data (which packet processor), and a time stamp. The quality of service and analysis parameters may depend on the analysis that will be done by the packet analyzer. The quality of service and analysis parameters stored in the packet record may include header information from the data packet such as a priority field. Other data that could be included in the packet record include the header fields of the packet, application protocol fields and the payload.

As introduced above with reference to FIG. 4, the packet processor 123A sends the packet record 125 to other packet processors at multiple points in the distributed network to distribute processing of the data packets. The packet processor needs to first determine where to send the packet record. As an example, the packet processor may determine where to send the packet record as follows. First, the packet processor monitors IP addresses flowing on the network and inspects the packet destination IP addresses to learn the identity of all gateways in the scope of the tap point monitor. The packet processor then communicates the identity of all the determined gateways to the packet analyzer. The packet analyzer may then distribute the identity of all the gateways to the other packet processors to allow the packet processors to forward the packet records to the packet processors of the other identified gateways. The other packet processors can then add data to the packet records for any of the unique packet signatures that are also identified by the packet processor as passing through the monitored point. Thus data for the same packet can be appended to the packet record for the unique packet signature. The same data can be stored as described above for the first packet processor that created the packet record.

Again referring to FIG. 4, each of the packet processors 123 receive packet data 214 from a different location in the network. Thus, all the packet processors are ingesting and processing data packets in parallel at the different locations. The rate of packet arrival is typically very high (for example 10 million per second), so the packet processors all have to take in that data, find the packets to further process as part of the sample and then store the chosen packets in a packet record. The packet record may be seen as a cache at the packet processor. The packet records may be analyzed by a packet processor or by the packet analyzer 124. When a packet processor receives a packet record, it adds corresponding data for the same packets from its own packet record. The packet processorB 123B forwards 410 the packet record 125 to packet analyzer 124. The packet processor 123A may also forward 412 its copy of the packet record to the packet analyzer 124. The packet analyzer then analyzes the packet record or records to look for problems in the network. Alternatively, the packet processing can be distributed through the system such that packet processorB 214B analyzes the combined packet record and reports results.

As mentioned previously, the packet analyzer analyzes the combined packet record or records to look for problems in the network. For example, the packet analyzer 124 may examine priority fields in the packet header and determine if they are correct for a given packet as it transits the network to identify unexpected changes in the priority. For example, when a given packet is tunneled the outer packet priority is set according to rules configured in the gateway, typically based on the inner packet's priority or protocol. If those rules have been set incorrectly, this mechanism can be used to identify an unexpected outer packet priority value based on the inner packet contents. In another example, the packet analyzer may identify high network latencies and excessive queueing with analytics applied to the timestamp values collected for a given packet at each of the tap points. In another example, packet drop rates can be calculated based on a given packet not being observed on the expected tap points within a bounded amount of time. An excessive packet drop rate can be flagged to the system administrator as a problem in the identified area of the network. In these examples, the high latencies, excessive queuing and high packet drop rates can be provided a system administrators to help find trouble points in the network that need repair.

Figure 5:
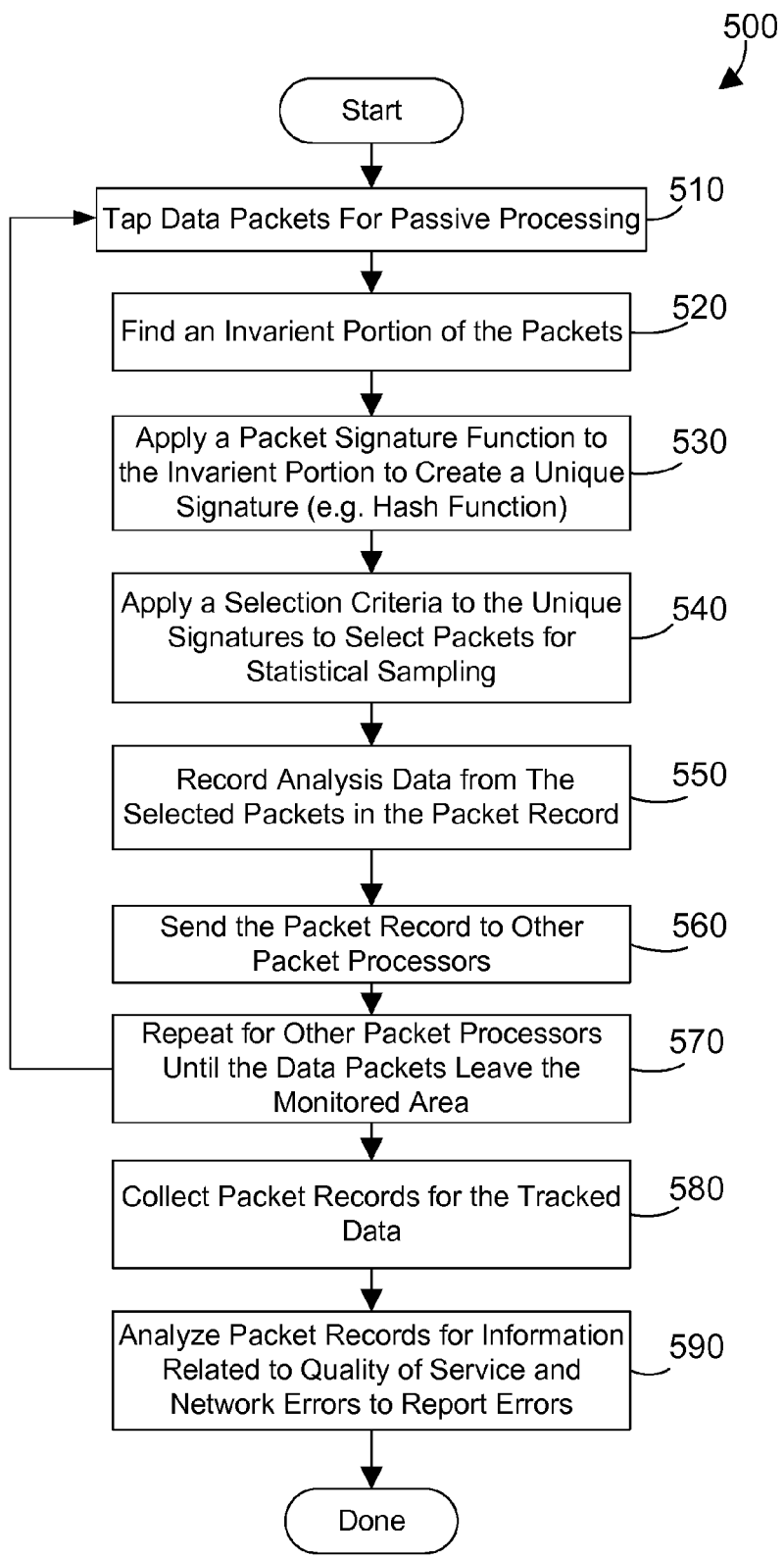
FIG. 5 is a flow diagram of a method for a system for problem analysis in a distributed network system.

Referring to FIG. 5, a method 500 shows one suitable example for problem analysis in a distributed network system. Portions of method 500 are preferably performed by the packet processor 123 and the packet analyzer 124 described above and shown in FIG. 1. First, tap data packets flowing in the distributed network for passive processing (step 510). Find an invariant portion of the packets (step 520). Then, apply a packet signature function to the invariant portion to create a unique signature for each data packet (step 530). Apply a selection criteria to the unique signatures to select packets for statistical sampling (step 540). Record data from the selected packets in a packet record (step 550). Send the packet record to other packet processors in the distributed network (step 560). Repeat the previous steps at the other packet processors until the selected data packets leave the monitored area (step 570). Collect the packet records for the tracked data (step 580). Analyze the packet records for information related to quality of service and network errors to report errors to the system or a user (step 590). The method is then done.

Figure 6:
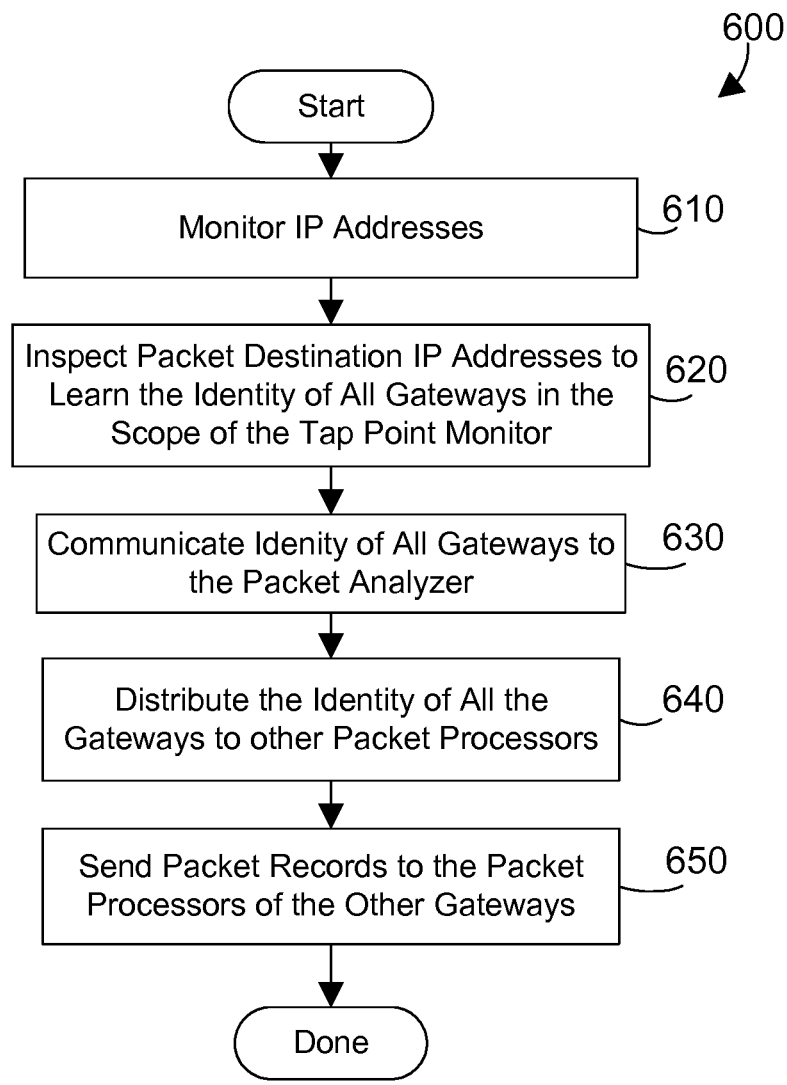
FIG. 6 is a flow diagram of a specific method for step 560 in FIG. 5.

FIG. 6 shows one suitable example of a method 600 for problem analysis in a distributed network system. Method 600 thus shows a suitable method for performing step 560 in method 500. First, monitor IP addresses flowing on the network (step 610). Inspect packet destination IP addresses to learn the identity of all gateways in the scope of the tap point monitor (step 620). Communicate the identity of all gateways to the packet analyzer (step 630). The packet analyzer distributes the identity of all the gateways to the other packet processors (step 640). The packet records are sent to the packet processors of the other identified gateways (step 650). The method is then done.

The disclosure and claims herein relate to a system for packet analysis in a distributed communication network. A packet processor taps into data packet flow at a point in the distribute network and processes data packets from the packet flow to select a set of packets using a packet signature function and packet selection criteria. A packet record is created and sent to other packet processors at multiple points in the distributed network to add data to the packet record for the same set of packets. The system gathers comparative data and analyzes it to identify problems in the network to improve quality of service.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus for analyzing a distributed network comprising:

a first packet processor that receives network data at a first location in the distributed network and processes data packets from the network data by applying a packet signature function to an invariant portion of the data packets to create a signature for each data packet;

wherein the first packet processor selects a set of data packets from the processed data packets with a selection criteria where the set of data packets contains a fraction of the data packets from the network data;

wherein the first packet processor creates a packet record containing information for the set of packets and sends the packet record to a second packet processor at a second location in the distributed network and wherein the second packet processor selects data packets with a selection criteria that matches the signature in the packet record received from the first packet processor;

wherein the first packet processor sends the packet record to other packet processors in the distributed network by:

inspecting packet destination IP addresses to learn the identity of all gateways;

communicating the identity of all gateways to a packet analyzer;

the packet analyzer distributing the identity of all the gateways to the other packet processors; and sending packet records to the packet processors of the other identified gateways.

2. The apparatus of claim 1 wherein the invariant portion of the data packets is the payload.

3. The apparatus of claim 2 wherein the payload is a tunneled payload.

4. The apparatus of claim 1 wherein the second packet processor receives network data at a second location in the distributed network, processes data packets from the network data by applying the packet signature function to an invariant portion of the data packets to create the signature for each data packet, then selects data packets from the processed data packets with the selection criteria that matches the signature in the packet record received from the first packet processor and adds packet information to the packet record for records with matching signatures.

5. The apparatus of claim 4 wherein the second packet processor further comprises a queue to record packets passing through the network and the second packet processor analyzes the packets in the queue and compares a signature for the packets in the queue to signatures in the packet record received from the first packet processor to find the matches and add packet data to the packet record.

6. The apparatus of claim 1 further comprising a packet analyzer that receives the packet record and analyzes the packet record data to determine problems with the network.

7. The apparatus of claim 6 further wherein the packet analyzer analyzes the packet record data to determine problems with the network by determining one of the following: unexpected changes in priority, high latencies, excessive queuing and high packet drop rates.

8. The apparatus of claim 1 wherein the packet signature function is a hash function.

9. The apparatus of claim 1 wherein the packet record contains quality of service and header information for analysis.

10. The apparatus of claim 1 further comprising a user interface in a packet analyzer for the user to specify the selection criteria.

11. A computer-implemented method executed by at least one processor for problem analysis in a distributed network system, the method comprising:

tapping data packets flowing in the distributed network for passive processing;

finding an invariant portion of the data packets;

applying a packet signature function to the invariant portion to create a unique signature for each data packet;

applying a selection criteria to the unique signatures to select packets for statistical sampling;

record data from the selected packets in a packet record;

sending the packet record to other packet processors in the distributed network comprising the steps of inspecting packet destination IP addresses to learn the identity of all gateways; communicating the identity of all gateways to a packet analyzer; the packet analyzer distributing the identity of all the gateways to the other packet processors; and sending packet records to the packet processors of the other identified gateways;

repeating the previous steps at a second packet processor to add data to the packet record;

receiving the packet record at a second packet processor from at least a first packet processor and wherein the second packet processor selects data packets with a selection criteria that matches the signature in the packet record received from the first packet processor;

analyzing the packet records for network problems; and reporting the network problems.

12. The method of claim 11 wherein sending the packet record to other packet processors further comprises:

inspecting packet destination IP addresses to learn the identity of all gateways in the scope of the tap point monitor;

communicating the identity of all gateways to a packet analyzer;

the packet analyzer distributing the identity of all the gateways to the other packet processors; and sending packet records to the packet processors of the other identified gateways.

13. The method of claim 11 wherein the invariant portion of the data packets is the payload.

14. The method of claim 13 wherein the payload is a tunneled payload.

15. The method of claim 11 wherein the second packet processor uses a queue to record packets passing through the network and the second packet processor analyzes the packets in the queue and compares a signature for the packets in the queue to signatures in the packet record to find the matches and add packet data to the packet record.

16. The method of claim 11 wherein the packet signature function is a hash function.

17. The method of claim 11 wherein the packet record contains quality of service and header information for analysis of network problems.

18. The method of claim 11 further comprising allowing a user to specify the selection criteria with a user interface.

19. The method of claim 11 wherein analyzing the packet records further includes identifying one of the following: unexpected changes in priority, high latencies, excessive queuing and high packet drop rates.

20. A computer-implemented method executed by at least one processor for problem analysis in a distributed network system, the method comprising:

tapping data packets flowing in the distributed network for passive processing;

finding an invariant portion of the data packets;

applying a hash function to a packet payload to create a unique signature for each data packet;

applying a selection criteria to the unique signatures to select packets for statistical sampling;
recording data from the selected packets in a packet record including quality of service and header information for analysis;
sending the packet record to other packet processors in the distributed network comprising the steps of:
  inspecting packet destination IP addresses to learn the identity of all gateways;
  communicating the identity of all gateways to a packet analyzer;
the packet analyzer distributing the identity of all the gateways to the other packet processors; and
  sending packet records to the packet processors of the other identified gateways;
repeating the previous steps at a second packet processor to add data to the packet record;
receiving the packet record from at least the second packet processor;
analyzing the packet records for information related to quality of service and network errors; and
reporting the network errors.

\* \* \* \* \*